United States Patent
Ishiko et al.

(10) Patent No.: US 11,720,383 B2
(45) Date of Patent: Aug. 8, 2023

(54) INFORMATION PROCESSING APPARATUS AND INFORMATION PROCESSING METHOD

(71) Applicant: SONY CORPORATION, Tokyo (JP)

(72) Inventors: Masatsugu Ishiko, Kanagawa (JP); Tsutomu Nakatsuru, Tokyo (JP)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 16/642,094

(22) PCT Filed: Jul. 25, 2018

(86) PCT No.: PCT/JP2018/027888
§ 371 (c)(1),
(2) Date: Feb. 26, 2020

(87) PCT Pub. No.: WO2019/049542
PCT Pub. Date: Mar. 14, 2019

(65) Prior Publication Data
US 2020/0192694 A1 Jun. 18, 2020

(30) Foreign Application Priority Data
Sep. 7, 2017 (JP) ................................. 2017-171951

(51) Int. Cl.
*G06F 9/455* (2018.01)

(52) U.S. Cl.
CPC .. *G06F 9/45558* (2013.01); *G06F 2009/4557* (2013.01); *G06F 2009/45579* (2013.01); *G06F 2009/45583* (2013.01)

(58) Field of Classification Search
CPC .. G06F 9/544; G06F 9/54; G06F 2009/45583; G06F 2009/45587; G06F 12/14
See application file for complete search history.

(56) References Cited

U.S. PATENT DOCUMENTS

| | | | |
|---|---|---|---|
| 6,519,594 B1* | 2/2003 | Li | H04L 12/2803 709/201 |
| 2002/0049719 A1* | 4/2002 | Shiomi | G06F 9/5016 |

(Continued)

FOREIGN PATENT DOCUMENTS

| | | |
|---|---|---|
| CN | 1325069 A | 12/2001 |
| CN | 102841810 A | 12/2012 |

(Continued)

OTHER PUBLICATIONS

Unknown Author, "Chapter 2. The Structure of the Java Virtual Machine", docs.oracle.com/javase/specs/jvms/se8/html/jvms-2.html, May 9, 2014 (Year: 2014).*

(Continued)

*Primary Examiner* — Lewis A Bullock, Jr.
*Assistant Examiner* — Kevin X Lu
(74) *Attorney, Agent, or Firm* — Chip Law Group

(57) ABSTRACT

An information processing apparatus is provided, the information processing apparatus including a processing unit that executes a virtual machine, in which the virtual machine operates a program with a stack machine, the virtual machine secures a first operation area where a first program operates, in a storage area allocated in a storage medium, and, when a second program different from the first program is called from the first program, the virtual machine secures a second operation area where the second program operates, in the storage area.

8 Claims, 3 Drawing Sheets

(56) References Cited

U.S. PATENT DOCUMENTS

| | | | | |
|---|---|---|---|---|
| 2002/0180793 | A1* | 12/2002 | Broussard | G06F 3/0481 |
| | | | | 715/766 |
| 2007/0169110 | A1* | 7/2007 | Gupta | G06F 8/65 |
| | | | | 717/174 |
| 2013/0097369 | A1* | 4/2013 | Talagala | G06F 12/0804 |
| | | | | 711/103 |
| 2014/0271252 | A1* | 9/2014 | Vines | F04B 43/073 |
| | | | | 417/53 |
| 2016/0007190 | A1* | 1/2016 | Wane | H04M 15/00 |
| | | | | 455/419 |
| 2019/0324882 | A1* | 10/2019 | Borello | G06F 9/544 |

FOREIGN PATENT DOCUMENTS

| | | | |
|---|---|---|---|
| EP | 1978444 | A1 | 10/2008 |
| JP | H0887478 | A | 4/1996 |
| JP | 2002-259146 | A | 9/2002 |
| JP | 2004-192447 | A | 7/2004 |
| JP | 2015-041349 | A | 3/2015 |

OTHER PUBLICATIONS

Unknown Author ("Oracle JDK 7 and JRE 7 Certified System Configurations", www.oracle.com/java/technologies/jdk-jre-7-cs-config.html, Jul. 28, 2011) (Year: 2011).*

International Search Report and Written Opinion of PCT Application No. PCT/JP2018/027888, dated Sep. 25, 2018, 08 pages of ISRWO.

Office Action for JP Patent Application No. 2019-540815 dated Jul. 19, 2022, 04 pages of English Translation and 04 pages of Office Action.

* cited by examiner

*FIG. 8*

| PROGRAM NUMBER | NATIVE CODE REFERENCE DESTINATION ADDRESS |
|---|---|
| 100 | 0x30000000 |
| 101 | 0x30001000 |
| 102 | 0x30002000 |
| ⋮ | ⋮ |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/027888 filed on Jul. 25, 2018, which claims priority benefit of Japanese Patent Application No. JP 2017-171951 filed in the Japan Patent Office on Sep. 7, 2017. Each of the above-referenced applications is hereby incorporated herein by reference in its entirety.

TECHNICAL FIELD

The present disclosure relates to an information processing apparatus and an information processing method.

BACKGROUND ART

Technologies relating to virtual machines (hereinafter sometimes abbreviated as "VM") have been developed. As a technology for controlling access to a shared memory area in each of a plurality of VMs, for example, a technology described in Patent Document 1 below can be cited.

CITATION LIST

Patent Document

Patent Document 1: Japanese Patent Application Laid-Open No. 2002-358205

SUMMARY OF THE INVENTION

Problems to be Solved by the Invention

For example, in the technology described in Patent Document 1, data reading from the shared memory area and data writing to the shared memory area are limited for each VM. Therefore, by using the technology described in Patent Document 1, it is possible to secure a firewall between application programs that are executed and operate in respective VMs.

However, for example, even if the technology described in Patent Document 1 is used, it is not possible to secure a firewall between a plurality of programs operating on one VM. Therefore, for example, even if the technology described in Patent Document 1 is used, improvement in security between a plurality of programs operating on one VM is not expected.

The present disclosure will propose a new and enhanced information processing apparatus and information processing method capable of achieving an improvement in security when a plurality of programs operates on a virtual machine.

Solutions to Problems

According to the present disclosure, an information processing apparatus is provided, the information processing apparatus including a processing unit that executes a virtual machine, in which the virtual machine operates a program with a stack machine, the virtual machine secures a first operation area where a first program operates, in a storage area allocated in a storage medium, and, when a second program different from the first program is called from the first program, the virtual machine secures a second operation area where the second program operates, in the storage area.

Furthermore, according to the present disclosure, an information processing method executed by an information processing apparatus is provided, the information processing method including a step of executing a virtual machine, in which the virtual machine operates a program with a stack machine, the virtual machine secures a first operation area where a first program operates, in a storage area allocated in a storage medium, and, when a second program different from the first program is called from the first program, the virtual machine secures a second operation area where the second program operates, in the storage area.

Effects of the Invention

According to the present disclosure, it is possible to achieve an improvement in security when a plurality of programs operates on a virtual machine.

Note that the above-mentioned effect is not necessarily limited, and any effects indicated in the present description or other effects that can be learned from the present description may be exhibited together with the above-mentioned effect or instead of the above-mentioned effect.

BRIEF DESCRIPTION OF DRAWINGS

FIG. 8 is an explanatory diagram for explaining an example of the execution of a native code in cooperation with a program being executed on the VM.

MODE FOR CARRYING OUT THE INVENTION

Figure 1:
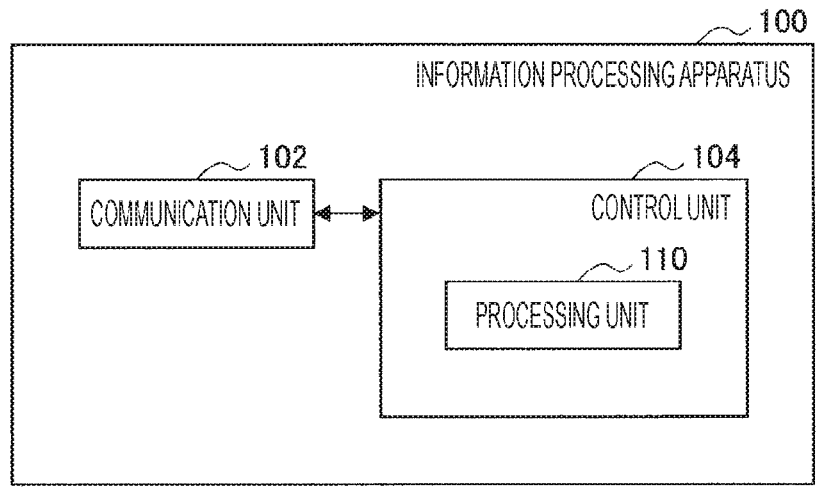
FIG. 1 is a block diagram illustrating an example of the configuration of an information processing apparatus according to the present embodiment.

Hereinafter, favorable embodiments of the present disclosure will be described in detail with reference to the accompanying drawings. Note that, in the present description and the drawings, constituent elements having substantially the same functional configuration will be denoted by the same reference numeral and redundant description will be omitted.

Furthermore, in the following, description will be given in the order indicated below.

1. Information Processing Apparatus according to Present Embodiment and Information Processing Method according to Present Embodiment
[1] Configuration of Information Processing Apparatus according to Present Embodiment
[2] Application Example of Information Processing Apparatus according to Present Embodiment
[3] Processing in line with Information Processing Method according to Present Embodiment
[4] Example of Effect Exhibited by Using Information Processing Method according to Present Embodiment (Information Processing Apparatus according to Present Embodiment and Information Processing Method According to Present Embodiment)

Hereinafter, an information processing method according to the present embodiment will be described while an example of an information processing apparatus according to the present embodiment is described.

Furthermore, in the following, a case where the information processing apparatus according to the present embodiment is an integrated circuit (IC) card will be mainly taken as an example. Note that the information processing apparatus according to the present embodiment is not limited to the IC card. Another application example of the information processing apparatus according to the present embodiment will be described later.

[1] Configuration of Information Processing Apparatus According to Present Embodiment FIG. 1 is a block diagram illustrating an example of the configuration of an information processing apparatus 100 according to the present embodiment. The information processing apparatus 100 includes, for example, a communication unit 102 and a control unit 104.

[Hardware Configuration Example of Information Processing Apparatus 100]

Figure 2:
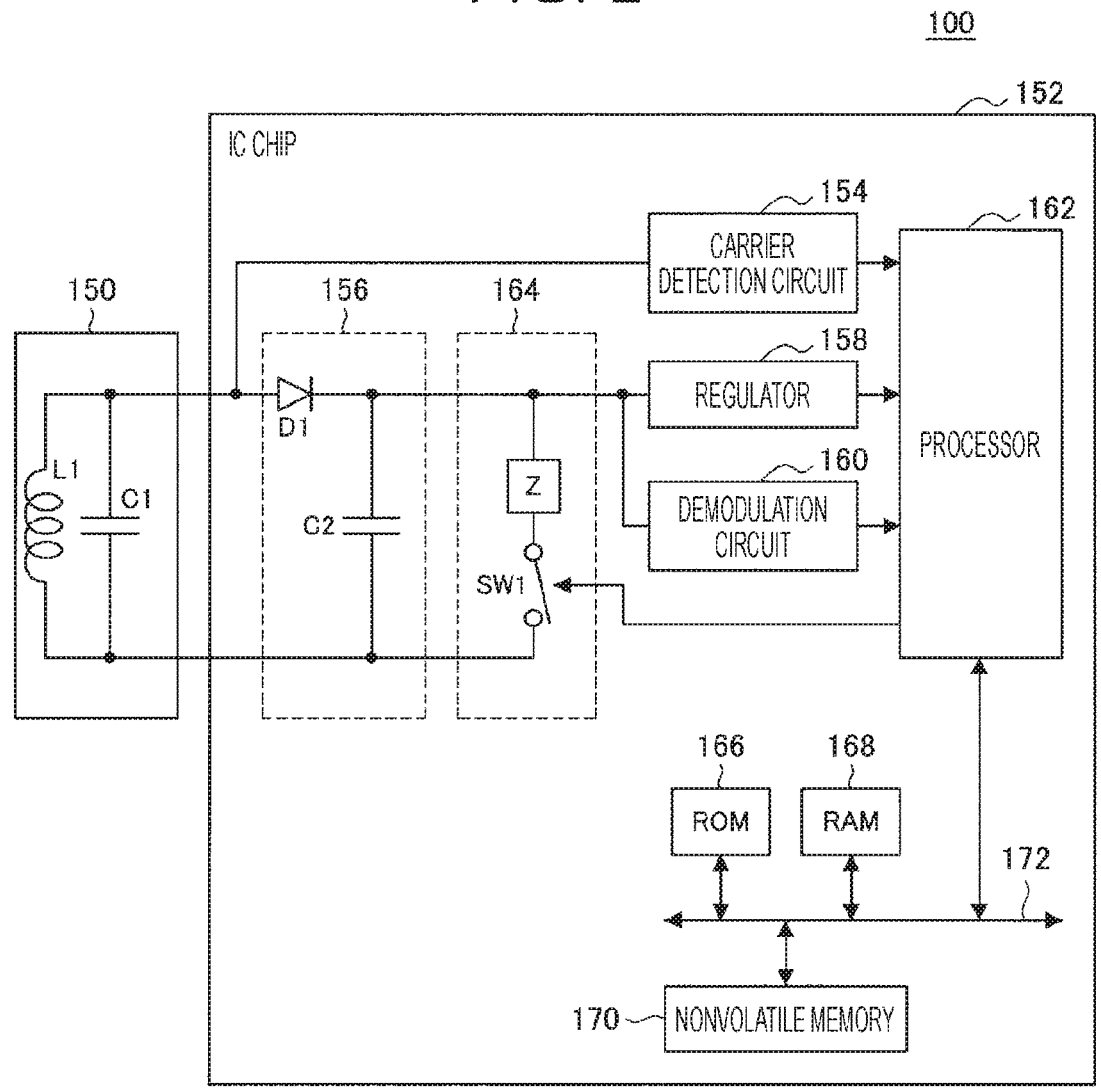
FIG. 2 is an explanatory diagram illustrating an example of a hardware configuration of the information processing apparatus according to the present embodiment.

FIG. 2 is an explanatory diagram illustrating an example of a hardware configuration of the information processing apparatus 100 according to the present embodiment. The information processing apparatus 100 includes, for example, an antenna 150 and an IC chip 152. Note that the information processing apparatus 100 does not have to include, for example, the configuration of the IC chip 152 illustrated in FIG. 2 in the form of an IC chip.

Figure 4:
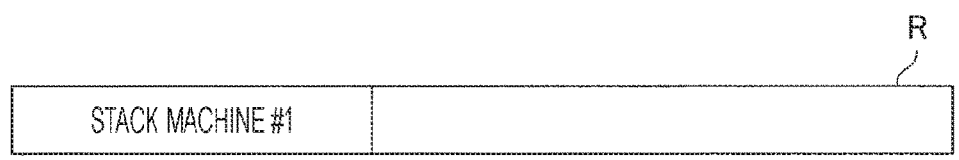
FIG. 4 is an explanatory diagram illustrating an example of the operation of a program on the VM in a case where one program operates on the VM.

The information processing apparatus 100 illustrated in FIG. 4 is driven by a reception voltage according to a carrier wave received by the antenna 150. Note that the information processing apparatus 100 can also be driven by, for example, electric power supplied from an internal power source such as a battery included in the information processing apparatus 100 or electric power supplied from a connected external power source.

The antenna 150 is constituted by, for example, a resonant circuit made up of a coil (inductor) L1 having a predetermined inductance and a capacitor C1 having a predetermined capacitance, and produces an induced voltage by electromagnetic induction in response to the reception of a carrier wave. Then, the antenna 150 outputs a reception voltage obtained by resonating the induced voltage at a predetermined resonance frequency. Here, for example, the resonance frequency of the antenna 150 is set in accordance with the frequency of the carrier wave such as 13.56 [MHz]. With the above configuration, the antenna 150 receives the carrier wave, and furthermore, transmits a response signal by load modulation performed in a load modulation circuit 164 included in the IC chip 152.

The IC chip 152 includes, for example, a carrier detection circuit 154, a wave sensing circuit 156, a regulator 158, a demodulation circuit 160, a processor 162, and the load modulation circuit 164. Note that, although not illustrated in FIG. 2, the IC chip 152 may further include a protection circuit (not illustrated) for avoiding an overvoltage or overcurrent from being applied to the processor 162, for example. Here, examples of the protection circuit (not illustrated) include a clamp circuit constituted by a diode or the like.

Furthermore, the IC chip 152 includes, for example, a read only memory (ROM) 166, a random access memory (RAM) 168, and a nonvolatile memory 170. The processor 162, the ROM 166, the RAM 168, and the nonvolatile memory 170 are connected by, for example, a bus 172 as a data transport path.

The ROM 166 stores control data such as a program and a calculation parameter used by the processor 162.

The RAM 168 temporarily stores a program executed by the processor 162, a calculation result, an execution state, and the like. In addition, in a case where the program executed by the processor 162 is a VM, the RAM 168 temporarily stores a program executed by the VM, a calculation result, an execution state, and the like.

The nonvolatile memory 170 stores diverse types of data such as the VM and various application programs. Here, examples of the nonvolatile memory 170 include an electrically erasable and programmable read only memory (EE-PROM) and a flash memory.

Furthermore, the nonvolatile memory 170 has tamper resistance, for example. By storing various types of data such as the VM in a secure recording medium having tamper resistance, such as the nonvolatile memory 170, the information processing apparatus 100 ensures data security.

For example, the carrier detection circuit 154 generates a rectangular detection signal on the basis of the reception voltage passed from the antenna 150, and passes the generated detection signal to the processor 162. In addition, the processor 162 uses the above detection signal that has been passed, as a processing clock for data processing, for example. Here, since the detection signal mentioned above is based on the reception voltage passed from the antenna 150, the detection signal is synchronized with the frequency of the carrier wave transmitted from an external apparatus such as a reader/writer. Accordingly, owing to including the carrier detection circuit 154, the IC chip 152 can perform processing with an external apparatus such as a reader/writer in synchronization with the external apparatus.

The wave sensing circuit 156 rectifies the reception voltage output from the antenna 150. Here, the wave sensing circuit 156 is constituted by, for example, a diode D1 and a capacitor C2.

The regulator 158 makes the reception voltage smooth and constant, and outputs a drive voltage to the processor 162. Here, the regulator 158 uses a direct current component of the reception voltage as the drive voltage. Note that, as described above, for example, in a case where the information processing apparatus 100 includes an internal power source such as a battery, or a case where an external power source is connected to the information processing apparatus 100, the information processing apparatus 100 can also be driven by electric power supplied from the internal power source or electric power supplied from the external power source.

The demodulation circuit 160 demodulates a carrier wave signal included in the carrier wave on the basis of the reception voltage, and outputs data corresponding to the carrier wave signal (for example, a data signal binarized into a high level and a low level). Here, the demodulation circuit 160 outputs an alternative current component of the reception voltage as the data.

The processor 162 is driven using, for example, the drive voltage output from the regulator 158 as a power source, and processes the data demodulated in the demodulation circuit 160. The processor 162 executes, for example, the VM, and processes the above-described data using the executed VM. Furthermore, the processor 162 may process the above-described data by executing a native code, for example.

In addition, the processor 162 selectively generates a control signal for controlling load modulation concerning a response to an external apparatus such as a reader/writer, according to the processing result. Then, the processor 162 selectively outputs the control signal to the load modulation circuit 164.

Note that the processing in the processor 162 is not limited to the processing of data demodulated in the demodulation circuit 160. For example, the processor 162 can process arbitrary data using the executed VM or by executing a native code (described later).

Here, the processor 162 is constituted by, for example, one or two or more processors, various processing circuits, and the like each constituted by an arithmetic circuit such as a micro processing unit (MPU).

The load modulation circuit 164 includes, for example, a load Z and a switch SW1, and performs load modulation by selectively connecting (enabling) the load Z according to a control signal passed from the processor 162. Here, the load Z is constituted by, for example, a resistor having a predetermined resistance value. Furthermore, the switch SW1 is constituted by, for example, a p-channel metal oxide semiconductor field effect transistor (MOSFET) or an n-channel MOSFET.

The IC chip 152 can process the carrier wave signal received by the antenna 150, for example, with the configuration as described above, and cause the antenna 150 to transmit a response signal by load modulation. Furthermore, the IC chip 152 can process arbitrary data using the executed VM or by executing a native code, for example, with the configuration as described above.

Note that the configuration of the information processing apparatus 100 according to the present embodiment is not limited to the configuration illustrated in FIG. 2. For example, the information processing apparatus 100 can be configured according to an application example of the information processing apparatus 100 described later.

With reference to FIG. 1 again, an example of the configuration of the information processing apparatus 100 will be described. The communication unit 102 is a communication part included in the information processing apparatus 100 and communicates with an external apparatus. The communication of the communication unit 102 is controlled by the control unit 104, for example.

Here, examples of the communication unit 102 include the antenna 150 and the IC chip 152 illustrated in FIG. 2. In a case where the communication unit 102 is constituted by the antenna 150 and the IC chip 152, the information processing apparatus 100 performs non-contact communication conforming to near field communication (NFC) prescribed by ISO/IEC18092 with an external apparatus such as a reader/writer, using a carrier wave having a predetermined frequency such as 13.56 [MHz].

Note that the communication unit 102 is not limited to the antenna 150 and the IC chip 152. For example, the communication unit 102 may be constituted by a communication device compatible with an arbitrary communication scheme, such as IEEE 802.15.1 port and transmission/reception circuit, or IEEE 802.11 port and transmission/reception circuit. Furthermore, the communication unit 102 may have a configuration capable of communicating with one or two or more external apparatuses or the like by a plurality of communication schemes.

The control unit 104 serves to control the information processing apparatus 100 as a whole. In addition, the control unit 104 includes, for example, a processing unit 110, and serves to lead processing in line with the information processing method according to the present embodiment described later.

Note that the configuration of the information processing apparatus according to the present embodiment is not limited to the configuration illustrated in FIG. 1.

For example, the information processing apparatus according to the present embodiment can include the processing unit 110 illustrated in FIG. 1 separately from the control unit 104 (for example, can achieve the processing unit 110 in another processing circuit).

Furthermore, the configuration of the information processing apparatus according to the present embodiment is not limited to the configuration illustrated in FIG. 1, and an arbitrary configuration according to the way of dividing processing in line with the information processing method according to the present embodiment described later can be employed.

In addition, for example, in a case where the information processing apparatus according to the present embodiment operates stand-alone or a case where communication with an external apparatus is performed via an external communication device having similar function and configuration to those of the communication unit 102, the information processing apparatus according to the present embodiment may not include the communication unit 102.

[2] Application Example of Information Processing Apparatus According to Present Embodiment In the above, a case where the information processing apparatus according to the present embodiment is an IC card has been taken as an example; however, the application example of the information processing apparatus according to the present embodiment is not limited to the example indicated above. The information processing apparatus according to the present embodiment can be applied to diverse pieces of equipment that can execute a VM and operate a program on the VM, for example, "a computer such as a personal computer (PC) or a server", "a tablet-type apparatus", "a game machine", and "any piece of Internet of things (IoT) equipment". Besides, the information processing apparatus according to the present embodiment can also be applied to an IC that can be incorporated into the equipment as described above, for example, "a subscriber identity module (SIM)", "an embedded universal integrated circuit card (eUICC)", "an embedded secure element (eSE) ", and "an IC compatible with trusted execution environment (TEE)".

[3] Processing in line with Information Processing Method According to Present Embodiment Next, processing in line with the information processing method according to the present embodiment performed in the information processing apparatus 100 will be described. Processing in line with the information processing method according to the present embodiment is performed by the processing unit 110, for example. In the following, for the sake of convenience, the information processing apparatus 100 will be described as performing processing in line with the information processing method according to the present embodiment.

The information processing apparatus 100 executes a VM. In the information processing apparatus 100, one or two or more programs are executed on the executed VM, and the executed programs each operate on the VM. The VM operates a program with a stack machine.

Here, the VM has, for example, an arithmetic processing block, and this arithmetic processing block accesses a stack and a program execution area secured on a storage medium, and sequentially executes programs one by one. In the present description, the stack and the program execution area accessed by the arithmetic processing block included in the VM are defined as a "stack machine". The stack machine according to the present embodiment is secured on a storage medium for each program executed on the VM. The VM operates on, for example, a physical processor and a RAM, and provides a plurality of stack machines, which are virtual program execution environments. Furthermore, the VM switches the program to be executed by switching the stack machine to be accessed by the arithmetic processing block included in the VM, among the plurality of stack machines secured on the storage medium.

Note that the program that operates on the VM is not limited to the operation with the stack machine, and may operate in accordance with an arbitrary computation model capable of operating the program in an operation area described later.

Figure 3:
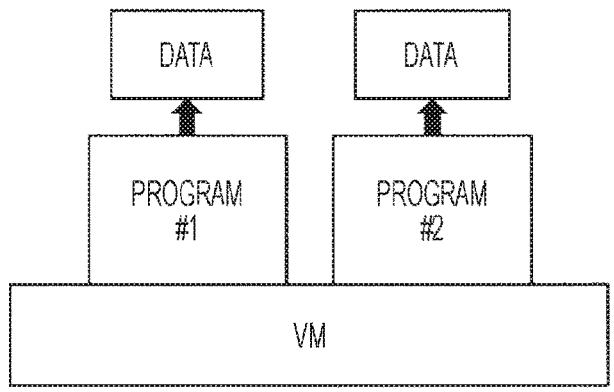
FIG. 3 is an explanatory diagram conceptually illustrating programs operating on a VM.

FIG. 3 is an explanatory diagram conceptually illustrating programs operating on the VM. FIG. 3 illustrates an example in which two programs, namely, a program #1 and a program #2, operate on the VM.

As illustrated in FIG. 3, the program #1 and the program #2 each operate on the VM, and data is processed by each program.

Note that the number of programs operating on the VM is not limited to two. For example, one program or three or more programs can operate on the VM. The following will describe the VM executed by the information processing apparatus 100, taking as an example a case where one program called program #1 operates on the VM, a case where two programs called program #1 and program #2 operate on the VM, and the like.

The VM secures an operation area in which a program operates, in a storage area allocated in a storage medium for each program to be executed. The storage area allocated in the storage medium represents, for example, a work memory area of the VM.

In a case where the information processing apparatus 100 has the hardware configuration illustrated in FIG. 2, a volatile memory such as the RAM 168 is cited as an example of the storage medium in which the operation area is secured. Note that, needless to say, the storage medium in which the operation area is secured is not limited to the RAM 168.

For example, the VM generates the stack machine for each program to be executed, and secures an area for storing the generated stack machine on a storage area allocated in the storage medium. An area in which the stack machine is stored represents the operation area.

Once the operation area is secured, the VM operates a program corresponding to the operation area in the secured operation area.

Hereinafter, an example of the operation of the program on the VM will be described by taking as an example a case where the program operates with the stack machine generated by the VM. Note that, as described above, the program that operates on the VM is not limited to the operation with the stack machine, and may operate in accordance with an arbitrary computation model capable of operating the program in the operation area secured in the storage medium.

(1) First Example of Program Operation on VM: Example of Program Operation in Case where One Program Operates on VM First, an example of the operation of a program on the VM in a case where one program operates on the VM will be described.

Figure 5A:
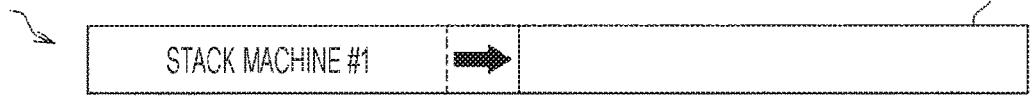
FIGS. 5A and 5B are explanatory diagrams illustrating an example of the operation of a program on the VM in a case where one program operates on the VM.
Figure 5B:

FIGS. 4, 5A, and 5B are explanatory diagrams illustrating an example of the operation of a program on the VM in a case where one program operates on the VM. A reference sign R illustrated in FIGS. 4, 5A, and 5B indicates a storage area (hereinafter, this similarly applies to other drawings).

As illustrated in FIG. 4, in a case where the program #1 is executed, the VM generates a stack machine #1 corresponding to the program #1, and secures an area for storing the stack machine #1 in the storage area R, thereby securing the operation area corresponding to the program #1. Since the operation area corresponding to the program #1 is secured by the VM, the operation of the program #1 is started.

Here, the size of the operation area required for the operation of the program #1 whose operation has been started can vary depending on the operation state of the stack machine #1, that is, the operation state of the program #1.

Therefore, the VM dynamically changes the size of the operation area according to the operation of the program. Here, dynamically changing the size of the operation area includes increasing the size of the operation area secured in the storage area, for example, as illustrated in FIG. 5A, and releasing a part of the operation area to reduce the size of the operation area, as illustrated in FIG. 5B. Note that, needless to say, the example of dynamically changing the size of the operation area is not limited to the example illustrated in FIG. 5A and the example illustrated in FIG. 5B.

In a case where the program operates with the stack machine, the VM secures an operation area corresponding to the program #1 in the storage area as much as necessary for the operation of the program #1, as illustrated in FIG. 5A. Note that the operation area secured by the VM is not limited to an area where the physical addresses in the storage area are successive. For example, the operation area secured by the VM may be an area where the physical addresses are not successive but the logical addresses are successive. Furthermore, the operation area secured by the VM may be an area where the physical addresses and the logical addresses are not successive, for example. Here, the logical address is also called a "virtual address".

In addition, in a case where the program operates with the stack machine, the VM releases an operation area corresponding to the program #1 by an amount no longer necessary for the operation of the program #1, as illustrated in FIG. 5B.

For example, when the size of the operation area is dynamically changed according to the operation of the program as illustrated in FIGS. 5A and 5B, the operation area corresponding to one program secured in the storage area is minimized to a size required for the operation of the program.

Therefore, the storage area allocated in the storage medium can be used more efficiently by the VM dynamically changing the size of the operation area according to the operation of the program. Furthermore, memory saving can be achieved owing to that more efficient use of the storage area is allowed.

Note that the control of the operation area by the VM is not limited to dynamically changing the size of the operation area according to the operation of the program.

For example, the VM releases an operation area corresponding to a program after terminating the execution of the program.

When the operation area is released after the execution of the program is terminated, an area in the storage area in which no operation area is secured, that is, an area in the storage area in which an operation area can be secured (so-called free area) can be further increased.

Therefore, the storage area allocated in the storage medium can be used more efficiently by the VM releasing an operation area corresponding to a program after terminating the execution of the program. Furthermore, as described above, memory saving can be achieved owing to that more efficient use of the storage area is allowed.

(2) Second Example of Program Operation on VM: Example of Program Operation in Case where Multiple Programs Operate on VM Next, an example of the operation of programs on the VM in a case where a plurality of programs operates on the VM will be described. In a case where a plurality of programs operates on the VM, the VM operates each of the plurality of programs similarly to the first example illustrated in (1) above.

More specifically, when executing the first program, the VM secures a first operation area in which the first program operates, in the storage area. Furthermore, when calling a second program different from the first program from the first program, the VM secures a second operation area in which the second program operates, in the storage area. At this time, for example, the VM interrupts the execution of the calling source first program. Then, the VM operates each of the plurality of programs similarly to the first example illustrated in (1) above.

In addition, for example, when terminating the execution of the called second program and executing the calling source first program, the VM releases the second operation area.

Figure 6:
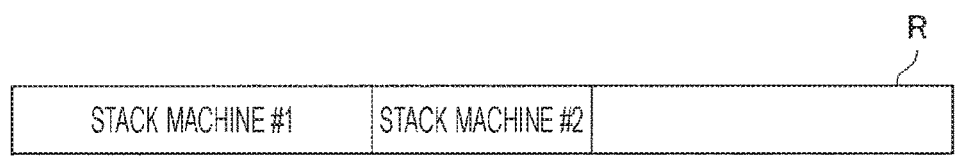
FIG. 6 is an explanatory diagram illustrating an example of the operation of programs on the VM in a case where a plurality of programs operates on the VM.

FIG. 6 is an explanatory diagram illustrating an example of the operation of programs on the VM in a case where a plurality of programs operates on the VM. FIG. 6 illustrates a case where two programs, namely, a program #1 and a program #2, operate on the VM.

As described above, the VM secures the operation area for each program to be executed, and operates the corresponding program in the secured operation area. To give an example, when executing the program #1 (an example of the first program), the VM secures an operation area corresponding to the program #1 (an operation area indicated as "stack machine #1" in FIG. 6), and operates the program #1 in this secured operation area. Furthermore, when calling the program #2 (an example of the second program) from the program #1, the VM secures an operation area corresponding to the program #2 (an operation area indicated as "stack machine #2" in FIG. 6), and operates the program #1 in this secured operation area. For this reason, as illustrated in FIG. 6, the operation area corresponding to the program #1 (the operation area indicated as "stack machine #1" in FIG. 6) and the operation area corresponding to the program #2 (the operation area indicated as "stack machine #2" in FIG. 6) are obtained as different areas in the storage area. Here, the state in which one operation area and another operation area are obtained as different areas means, for example, that the physical addresses of the one operation area and the another operation area, and the logical addresses of the one operation area and the another operation area are different from each other.

When one operation area and another operation area are obtained as different areas as illustrated in FIG. 6, it becomes possible to secure a firewall between a plurality of programs operating on the VM.

Accordingly, the information processing apparatus 100 can achieve an improvement in security when a plurality of programs operates on the VM.

Next, cooperation between programs in a case where a plurality of programs operates on the VM will be described.

Cooperation between programs in the information processing apparatus 100 is fulfilled by the VM controlling data transfer between a plurality of programs being executed.

As indicated in an example described later, the VM controls data transfer by converting the logical address of the operation area and the physical address of the operation area corresponding to each of a plurality of programs being executed.

For example, the VM refers to conversion information for converting the logical address and the physical address in the storage medium, to convert the logical address of the operation area and the physical address of the operation area corresponding to each of the plurality of programs being executed. Examples of the conversion information according to the present embodiment include a table (or a database) in which the logical addresses and the physical addresses in the storage medium are associated with each other. The conversion information is stored in an arbitrary storage medium such as the nonvolatile memory 170.

The VM updates the conversion information at any timing concerning securing the operation area, such as when securing the operation area in the storage area, a timing to release the operation area secured in the storage area, an end timing of data transfer between multiple programs, or an arbitrary timing concerning the alteration to the operation area, such as when dynamically changing the size of the operation area.

Note that the "method of converting the logical address of the operation area and the physical address of the operation area" according to the present embodiment is not limited to the method using the conversion information. For example, the VM may convert the logical address of the operation area and the physical address of the operation area by "processing in line with an arbitrary algorithm capable of converting the logical address and the physical address in the storage medium".

Here, a buffer area (hereinafter simply referred to as "buffer") is provided in the operation area corresponding to each program secured in the storage area. The buffer provided in the operation area is an area visible only from the program corresponding to this operation area. However, a part or the whole of the buffer provided in the operation area can be made available to an external program not corresponding to the operation area, for example, by establishing a link with another buffer. Establishing a link between different buffers is fulfilled by the above-described conversion information and the like. The VM fulfills cooperation between programs in the information processing apparatus 100 by a mechanism that can make a part or the whole of the buffer provided in the operation area available to an external program.

In the following, a buffer in an operation area corresponding to one program when viewed from the one program is referred to as an "internal buffer". Furthermore, in the following, a buffer in an operation area corresponding to another program when viewed from the one program, which has been made available, is referred to as an "external buffer".

For example, taking as an example the case of data transfer between the first program and the second program, the VM transfers data between the first program and the second program via a first buffer provided in the first operation area and a second buffer provided in the second operation area.

For example, in a case where data of the first program is shared by the second program, the VM refers to the first buffer from the second buffer. At this time, the VM may share data of the first program in the second program by referring to a part of the first buffer from the second buffer. Reference between different buffers is fulfilled, for example, by establishing a link between different buffers using the above conversion information or the like. In addition, a link established between different buffers is disconnected at an arbitrary timing such as an end timing of data transfer between a plurality of programs.

In different terms, in a case where the second buffer includes an external buffer of the first buffer (a buffer linked to the first buffer), the VM shares data of the first program in the second program by referring to the first buffer from the external buffer.

Note that, in the above, an example in which the data of the first program is shared by the second program has been indicated; however, the VM can share data of the second program in the first program with a similar mechanism.

Hereinafter, taking the case illustrated in FIG. 6 as an example, cooperation between programs in a case where a plurality of programs operates on the VM will be described. In the following, data transfer between a plurality of programs is sometimes referred to as "communication between programs".

For example, in a case where communication with the program #2 (an example of communication between programs) occurs in processing in the program #1 while the program #1 is operating, the VM secures an operation area corresponding to the program #2. Once the operation area corresponding to the program #2 is secured, the operation of the program #2 is started, and communication between programs in the programs #1 and #2 is performed.

When the communication between the programs #1 and #2 is completed, the VM releases the operation area corresponding to the program #2, and also continues the operation of the program #1.

As described above, the operation area corresponding to the program #1 and the operation area corresponding to the program #2 are different areas. Therefore, a firewall is secured in communication between programs in the programs #1 and #2.

Hereinafter, control of data transfer between a plurality of programs by the VM will be described by taking the above-described communication between programs in the programs #1 and #2 as an example.

Figure 7:
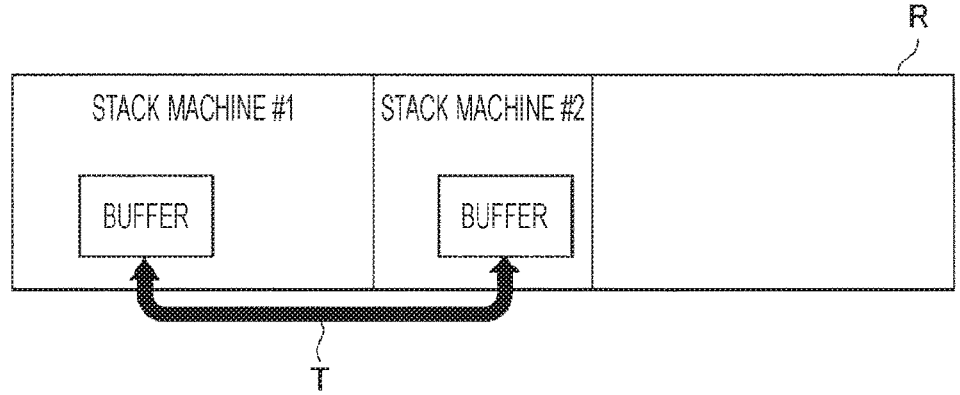
FIG. 7 is an explanatory diagram for explaining an example of control of data transfer between a plurality of programs by the VM.

FIG. 7 is an explanatory diagram for explaining an example of control of data transfer between a plurality of programs by the VM.

For example, in a case where communication with the program #2 occurs in processing in the program #1 while the program #1 is operating, the VM secures a buffer for the program #1 in the operation area corresponding to the program #1. When securing a buffer in the operation area corresponding to the program #1, the VM may change the size of the operation area corresponding to the program #1.

Furthermore, as described above, in a case where communication with the program #2 occurs in processing in the program #1, the VM secures an operation area corresponding to the program #2. In addition, the VM secures a buffer for the program #2 in the operation area corresponding to the program #2.

As viewed from the program #1 operating on the VM, the buffer for the program #1 is an area where data reading and data writing are both allowed. Meanwhile, as viewed from the program #2 operating on the VM, the buffer for the program #1 is an area where neither data reading nor data writing are allowed. Note that, as described above, the buffer for the program #1 may include an external buffer of the program #2 (a buffer available to the program #2).

Data reading from the buffer for the program #1 by the program #1 and data writing to the buffer for the program #1 by the program #1 are performed, for example, by "the VM converting the logical address of the operation area corresponding to the program #1 and the physical address of the operation area corresponding to the program #1".

Furthermore, as viewed from the program #2 operating on the VM, the buffer for the program #2 is an area where data reading and data writing are both allowed. Meanwhile, as viewed from the program #1 operating on the VM, the buffer for the program #2 is an area where neither data reading nor data writing are allowed. Note that, as described above, the buffer for the program #2 may include an external buffer of the program #1 (a buffer available to the program #1).

Data reading from the buffer for the program #2 by the program #2 and data writing to the buffer for the program #2 by the program #2 are performed, for example, by "the VM converting the logical address of the operation area corresponding to the program #2 and the physical address of the operation area corresponding to the program #2".

In a case where communication with the program #2 occurs in processing in the program #1, the program #1 designates the logical address of the buffer for the program #1. Once the logical address of the buffer for the program #1 is designated, the VM converts the logical address of the operation area corresponding to the program #1 and the physical address of the operation area corresponding to the program #1. The program #1 accesses a physical address in the storage medium corresponding to the designated logical address via the VM, and writes data to be delivered to the program #2 in the buffer for the program #1.

The VM writes the data stored in the buffer for the program #1 to the buffer for the program #2. Furthermore, the VM may delete the data from the buffer for the program #1 after writing the data to the buffer for the program #2.

Here, the VM can specify the physical address of the buffer for the program #1 and the physical address of the buffer for the program #2, for example, by referring to the conversion information. Therefore, as indicated by T in FIG. 7, the VM can "copy data between the buffer for the program #1 and the buffer for the program #2" or "move data between the buffer for the program #1 and the buffer for the program #2".

Consequently, data transfer via the VM is fulfilled between the programs #1 and #2. In addition, data sharing between the programs #1 and #2 is fulfilled by transferring data via the VM.

As described above, data transfer between the programs #1 and #2 is fulfilled by logical address-physical address conversion by the VM. Therefore, data transfer between the programs #1 and #2 (an example of data transfer between a plurality of programs operating on the VM) is secure.

Hereinafter, an example of data transfer between the programs #1 and #2 will be described.

First, an example of data transfer from the program #1 to the program #2 will be described.

The program #1 designates the logical address of the buffer for the program #1. Once the logical address of the buffer for the program #1 is designated, the VM converts the logical address of the operation area corresponding to the program #1 and the physical address of the operation area corresponding to the program #1. Therefore, the program #1 can access a physical address in the storage medium corresponding to the designated logical address via the VM, and write data to the buffer for the program #1.

As indicated by T in FIG. 7, the VM copies data written in the buffer for the program #1 by the program #1 to the buffer for the program #2, and deletes the copy source data from the buffer for the program #1.

The program #2 designates the logical address of the buffer for the program #2. Once the logical address of the buffer for the program #2 is designated, the VM converts the logical address of the operation area corresponding to the program #2 and the physical address of the operation area corresponding to the program #2. Therefore, the program #2 can access a physical address in the storage medium corresponding to the designated logical address via the VM, and read data from the buffer for the program #2.

For example, as described above, data transfer from the program #1 to the program #2 is fulfilled by interposing the VM. Here, data transfer from the program #1 to the program #2 can be understood as, for example, transmission of data from the program #1 to the program #2 and reception of the transmitted data by the program #2.

Furthermore, the program #2 can perform processing using the data accepted from the program #1. Therefore, in the information processing apparatus 100, cooperation between the programs #1 and #2 (an example of cooperation between a plurality of programs operating on the VM) is fulfilled.

Next, as an example of data transfer from the program #2 to the program #1, "transfer of data indicating the result of processing in the program #2" from the program #2 to the program #1 will be described.

The program #2 designates the logical address of the buffer for the program #2. Once the logical address of the buffer for the program #2 is designated, the VM converts the logical address of the operation area corresponding to the program #2 and the physical address of the operation area corresponding to the program #2. Therefore, the program #2 can access a physical address in the storage medium corresponding to the designated logical address via the VM, and write data indicating the result of processing in the program #2 to the buffer for the program #2.

As indicated by T in FIG. 7, the VM copies data written in the buffer for the program #2 by the program #2 to the buffer for the program #1, and deletes the copy source data from the buffer for the program #2.

The program #1 designates the logical address of the buffer for the program #1. Once the logical address of the buffer for the program #1 is designated, the VM converts the logical address of the operation area corresponding to the program #1 and the physical address of the operation area corresponding to the program #1. Therefore, the program #1 can access a physical address in the storage medium corresponding to the designated logical address via the VM, and read data indicating the result of processing in the program #2 from the buffer for the program #1.

For example, as described above, data transfer from the program #2 to the program #1 is fulfilled by interposing the VM. Here, data transfer from the program #2 to the program #1 can be understood as, for example, transmission of data from the program #2 to the program #1 and reception of the transmitted data by the program #1.

Furthermore, the program #1 can perform processing using the data accepted from the program #2. Therefore, in the information processing apparatus 100, cooperation between the programs #1 and #2 (an example of cooperation between a plurality of programs operating on the VM) is fulfilled.

For example, data transfer is fulfilled between the programs #1 and #2 as described above. Note that, needless to say, the example of data transfer between the programs #1 and #2 is not limited to the example indicated above.

In addition, in the information processing apparatus 100, for example, by "performing data transfer between two programs as in the above-described example between every two distinct programs", cooperative processing between three or more programs operating on the VM can be fulfilled.

(3) Third Example of Program Operation on VM: Execution of Native Code in Cooperation with Program Operating on VM Note that the example of the program operation on the VM is not limited to the first and second examples described above. For example, the information processing apparatus 100 can also fulfill the execution of a native code in cooperation with a program being executed on the VM by calling the native code from the program being executed on the VM.

The native code according to the present embodiment is a code that can be executed on an arbitrary processor included in the information processing apparatus 100, such as the processor 162. Since the native code is executed by a processor included in the information processing apparatus 100, the native code operates at a processing speed that the processor has. Furthermore, a part or the whole of the VM may be implemented by the native code. In the following, a case where a native code is executed by the processor 162 will be taken as an example.

The execution of the native code in cooperation with a program being executed on the VM is fulfilled by the VM controlling data transfer between the program and the native code.

For example, data cooperation as described below is fulfilled in the information processing apparatus 100 by executing the native code in cooperation with the program being executed on the VM. Note that, needless to say, the example of data cooperation between the program being executed on the VM and the native code executed by the processor 162 is not limited to the example indicated below.

Data is delivered from the program being executed on the VM to the native code, and processing using the data delivered from the program being executed on the VM is performed by executing the native code. Data indicating the result of processing in the native code is delivered from the native code being executed to the program being executed on the VM, and the program being executed on the VM performs processing using the data indicating the result of the processing in the native code.

For example, as described above, data cooperation between the program being executed on the VM and the native code executed by the processor 162 is performed, such that the implementation of a part of processing of the program executed on the VM in the native code is fulfilled in the information processing apparatus 100.

More specifically, the VM secures a cooperation area for cooperation between the program and the native code in the storage area of the storage medium. The VM secures the cooperation area similarly to the operation area described above.

Furthermore, the VM transfers data between the program and the native code via the cooperation area, similarly to data transfer between the first program and the second program described above. With the data cooperation via the cooperation area as described above, the execution of the native code in cooperation with the program being executed is fulfilled.

Hereinafter, an example of the execution of the native code in cooperation with the program being executed on the VM will be described by taking "data cooperation between the program #1 illustrated in FIG. 4 and the native code executed by the processor 162" as an example.

For example, in a case where the native code is called in processing in the program #1 while the program #1 is operating, the VM specifies a native code corresponding to the program #1. The VM refers to, for example, a "reference table (or a reference database) in which the program is associated with an address in the recording medium where the native code is stored" to specify the native code corresponding to the program #1. Here, the address in the recording medium where the native code is stored, which is stored in the above-mentioned reference table, may be a physical address or a logical address.

FIG. 8 is an explanatory diagram for explaining an example of the execution of the native code in cooperation with a program being executed on the VM, and illustrates an example of the reference table. In the reference table illustrated in FIG. 8, a program number indicating the program being executed on the VM is associated with a head address of the native code. Note that, needless to say, the example of the reference table is not limited to the example illustrated in FIG. 8.

Once the native code corresponding to the program #1 is specified, the native code corresponding to the program #1 is executed by the processor 162. For example, the processor 162 executes the native code corresponding to the program #1 by accessing the head address of the native code passed from the VM.

Furthermore, when the native code corresponding to the program #1 is specified, the VM temporarily stops the execution of the program #1, for example. Note that the VM is also allowed not to stop the execution of the program #1.

In addition, the VM secures a cooperation area for cooperation between the program #1 and the native code corresponding to the program #1. For example, the VM generates a stack machine for the native code corresponding to the program #1, and stores the stack machine for the native code in the above cooperation area.

When the VM secures the cooperation area for cooperation between the program #1 and the native code corresponding to the program #1, the operation area corresponding to the program #1 and this cooperation area are obtained as different areas. Here, the state in which the operation area and the cooperation area are obtained as different areas means, for example, that the physical addresses of the operation area and the cooperation area, and the logical addresses of the operation area and the cooperation area are different from each other.

Therefore, since the operation area and the cooperation area are obtained as different areas, it becomes possible to secure a firewall between the program operating on the VM and the native code executed by the processor 162. Accordingly, the information processing apparatus 100 can achieve an improvement in security in data cooperation between the program being executed on the VM and the native code executed by the processor.

The VM controls data transfer from the operation area corresponding to the program #1 to the cooperation area for cooperation between the program #1 and the native code corresponding to the program #1. Data transfer between the operation area corresponding to the program #1 and the cooperation area for cooperation between the program #1 and the native code corresponding to the program #1 is similar to the second example indicated in (2) above.

The VM copies data stored in the cooperation area for cooperation between the program #1 and the native code corresponding to the program #1 to a storage area of a storage medium accessible by the processor 162. Data transfer between the cooperation area and the storage area of the storage medium accessible by the processor 162 is fulfilled by, for example, the logical address-physical address conversion by the VM, as in the second example indicated in (2) above. The storage medium accessible by the processor 162 may be the same storage medium as the storage medium in which the operation area and the cooperation area are secured, or may be a different storage medium. Furthermore, for example, the VM deletes the copy source data from the cooperation area for cooperation between the program #1 and the native code corresponding to the program #1.

The native code corresponding to the program #1 executed by the processor 162 reads, from the above-described storage area of the storage medium accessible by the processor 162, data copied from the cooperation area for cooperation between the program #1 and the native code corresponding to the program #1. Then, the native code corresponding to the program #1 executed by the processor 162 performs processing using the above copied data that has been read.

As described above, in the information processing apparatus 100, the operation area corresponding to the program #1 is not directly accessed from the native code corresponding to the program #1 executed by the processor 162. Therefore, in the information processing apparatus 100, secure data transfer is fulfilled between the program #1 and the native code corresponding to the program #1.

Once the above-mentioned processing using the copied data is completed, the native code corresponding to the program #1 executed by the processor 162 writes data indicating the result of the processing to the above-described storage area of the storage medium accessible by the processor 162.

The VM copies data stored in the storage area of the storage medium accessible by the processor 162 to the cooperation area for cooperation between the program #1 and the native code corresponding to the program #1.

Furthermore, the VM controls data transfer from the cooperation area for cooperation between the program #1 and the native code corresponding to the program #1 to the operation area corresponding to the program #1. Data transfer between the cooperation area for cooperation between the program #1 and the native code corresponding to the program #1 and the operation area corresponding to the program #1 is similar to the second example indicated in (2) above.

Once data transfer from the cooperation area for cooperation between the program #1 and the native code corresponding to the program #1 to the operation area corresponding to the program #1 is completed, the VM releases the cooperation area for cooperation between the program #1 and the native code corresponding to the program #1.

When data transfer from the cooperation area for cooperation between the program #1 and the native code corresponding to the program #1 to the operation area corresponding to the program #1 is completed, the VM starts the execution of the program #1 that has been temporarily stopped.

The program #1 designates the logical address of the buffer for the program #1, and reads data indicating the result of the processing in the native code from the buffer for the program #1. Then, the program #1 performs processing using the data indicating the result of the processing in the native code.

For example, as described above, the data cooperation between the program #1 being executed on the VM and the native code executed by the processor 162 is fulfilled by interposing the VM. Note that, needless to say, the example of data cooperation between the program #1 being executed on the VM and the native code executed by the processor 162 is not limited to the example indicated above.

(4) Fourth Example of Program Operation on VM

The program that operates on the VM executed in the information processing apparatus 100 can also perform, for example, an operation combining the first example indicated in (1) above and the third example indicated in (3) above, or an operation combining the second example indicated in (2) above and the third example indicated in (3) above.

[4] Example of Effect Exhibited by Using Information Processing Method According to Present Embodiment By using the information processing method according to the present embodiment, the effects indicated below are exhibited in the information processing apparatus according to the present embodiment, for example. Note that, needless to say, the effects exhibited by using the information processing method according to the present embodiment are not limited to the examples indicated below.

By using the information processing method according to the present embodiment, as described above, the storage area allocated in the storage medium can be used more efficiently, and additionally memory saving can be achieved. Therefore, even in a case where the information processing apparatus according to the present embodiment has a hardware environment with limited resources, such as a case where the memory capacity is about several kilobytes, a plurality of programs can be operated on the VM.

Even in a case where the information processing apparatus according to the present embodiment does not have a hardware environment with limited resources as described above, a plurality of programs can be operated on the VM. Therefore, as described above, the information processing apparatus according to the present embodiment can be applied to diverse pieces of equipment capable of executing the VM and executing a program on the VM, such as a server.

A secure execution environment in which programs are separated by a firewall is fulfilled by the VM.

Data communication between programs (data transfer between programs) is made secure, and secure data sharing between programs is fulfilled by the VM.

In a case where the information processing apparatus 100 has a physical secure hardware environment such as SIM, a secure data communication function between a plurality of programs is fulfilled by the VM in the information processing apparatus 100.

A plurality of programs can be operated on the VM, and besides a secure execution environment in which the programs are separated by a firewall is fulfilled. In other words, in a case where the information processing method according to the present embodiment is used, there is no need to execute the VM for each program in order to fulfill a secure execution environment in which programs are separated by a firewall, for example, as in a case where the technology described in Patent Document 1 is used. Therefore, the information processing method according to the present embodiment can be applied to equipment having a hardware environment with limited resources more easily than a case where the technology described in Patent Document 1 is used, for example.

In the information processing apparatus 100, a function for calling the native code from a program being executed on the VM is fulfilled by the VM. Therefore, in the information processing apparatus 100, it is possible to implement a part of processing of the program executed on the VM in the native code. Furthermore, implementing a part of processing of the program executed on the VM in the native code is effective in a case where there is a memory restriction in the information processing apparatus 100.

In the VM, data in a part of memory area can be shared by the external buffer mechanism.

At least a part of the program of the VM can be implemented in the native code. Therefore, for example, at least a part of the program of the VM can be implemented in the native code according to the program size saved in the nonvolatile memory, and besides processing that requires higher program execution speed can be implemented in the native code.

The favorable embodiments of the present disclosure have been described in detail thus far with reference to the accompanying drawings. However, the technological scope of the present disclosure is not limited to these examples. It is clear that a person with average knowledge on the technological field of the present disclosure can arrive at various variations or modifications within the range of the technological spirit disclosed in claims and as a matter of course, these variations or modifications are comprehended as part of the technological scope of the present disclosure.

Furthermore, the effects described in the present description are merely illustrative or exemplary and are not limiting. In other words, the technology according to the present disclosure can exhibit other effects obvious to those skilled in the art from the description of the present description together with the above-described effects or instead of the above-described effects.

Note that configurations as described below are also within the technological scope of the present disclosure.

(1)

An information processing apparatus including a processing unit that executes a virtual machine, in which the virtual machine operates a program with a stack machine, the virtual machine secures a first operation area where a first program operates, in a storage area allocated in a storage medium, and when a second program different from the first program is called from the first program, the virtual machine secures a second operation area where the second program operates, in the storage area.

(2)

The information processing apparatus according to (1), in which, when terminating the execution of the called second program and executing the calling source first program, the virtual machine releases the second operation area.

(3)

The information processing apparatus according to (1) or (2), in which the virtual machine transfers data between the first program and the second program via a first buffer provided in the first operation area and a second buffer provided in the second operation area.

(4)

The information processing apparatus according to (3), in which the virtual machine shares data of the first program in the second program by referring to the first buffer from the second buffer.

(5)

The information processing apparatus according to (4), in which the virtual machine shares data of the first program in the second program by referring to a part of the first buffer from the second buffer.

(6)

The information processing apparatus according to (4) or (5), in which the second buffer includes an external buffer of the first buffer linked to the first buffer, and the virtual machine shares data of the first program in second program by referring to the first buffer from the external buffer.

(7)

The information processing apparatus according to any one of (1) to (6), in which the virtual machine is implemented in a native code executed by a processor, the virtual machine secures a cooperation area for cooperation between a program and the native code in the storage area, and the virtual machine performs data transfer between the program and the native code via the cooperation area.

(8)

The information processing apparatus according to any one of (1) to (7), in which the information processing apparatus includes an integrated circuit (IC) card.

(9)

An information processing method executed by an information processing apparatus, the information processing method including a step of executing a virtual machine, in which the virtual machine operates a program with a stack machine, the virtual machine secures a first operation area where a first program operates, in a storage area allocated in a storage medium, and when a second program different from the first program is called from the first program, the virtual machine secures a second operation area where the second program operates, in the storage area.

REFERENCE SIGNS LIST

100 Information processing apparatus
102 Communication unit
104 Control unit
110 Processing unit

The invention claimed is:

1. An information processing apparatus, comprising:
a processor configured to execute a virtual machine, wherein the virtual machine is configured to:
operate a plurality of programs with a stack machine;
secure a first operation area in a storage area allocated in a storage medium, wherein the first operation area is an area where a first program of the plurality of programs operates;
secure a second operation area in the storage area based on a second program that is called from the first program, wherein
the second operation area is an area where the second program of the plurality of programs operates,
the second program is different from the first program,
the first program designates a logical address of a first buffer for the first program, and
the second program designates a logical address of a second buffer for the second program;
determine a physical address of the first buffer based on the logical address of the first buffer designated by the first program;
secure, in the first operation area, the first buffer for the first program based on the determined physical address of the first buffer;
determine a physical address of the second buffer based on the logical address of the second buffer designated by the second program;
secure, in the second operation area, the second buffer for the second program based on the determined physical address of the second buffer, wherein
the first buffer is an area where a data writing operation by the second program is not allowed, and
the second buffer is an area where a data reading operation by the first program is not allowed;
transfer data from the first buffer in the first operation area to the second buffer in the second operation area; and
delete the data from the first buffer subsequent to the transfer of the data.

2. The information processing apparatus according to claim 1, wherein the virtual machine is further configured to release the second operation area in a case where execution of the second program terminates and the first program continues to execute.

3. The information processing apparatus according to claim 1, wherein the virtual machine is further configured to share the data of the first program to the second program with reference to the first buffer from the second buffer.

4. The information processing apparatus according to claim 3, wherein the virtual machine is further configured to share the data of the first program to the second program with reference to a part of the first buffer from the second buffer.

5. The information processing apparatus according to claim 3, wherein
the second buffer includes an external buffer linked to the first buffer, and
the virtual machine is further configured to share the data of the first program to the second program with reference to the first buffer from the external buffer.

6. The information processing apparatus according to claim 1, wherein
the virtual machine is implemented in a native code executed by the processor, and
the virtual machine is further configured to:
secure a cooperation area, for cooperation between the first program and the native code, in the storage area; and execute data transfer between the first program and the native code through the cooperation area.

7. The information processing apparatus according to claim 1, wherein the information processing apparatus includes an integrated circuit (IC) card.

8. An information processing method, comprising:
in an information processing apparatus that includes a processor:
executing, by the processor, a virtual machine;
operating, by the virtual machine, a plurality of programs with a stack machine;
securing, by the virtual machine, a first operation area in a storage area allocated in a storage medium, wherein the first operation area is an area where a first program of the plurality of programs operates;
securing, by the virtual machine, a second operation area in the storage area based on a second program that is called from the first program, wherein
the second operation area is an area where the second program of the plurality of programs operates,
the second program is different from the first program,
the first program designates a logical address of a first buffer for the first program, and
the second program designates a logical address of a second buffer for the second program;
determining, by the virtual machine, a physical address of the first buffer based on the logical address of the first buffer designated by the first program;
securing, by the virtual machine, the first buffer for the first program in the first operation area, based on the determined physical address of the first buffer;
determining, by the virtual machine, a physical address of the second buffer based on the logical address of the second buffer designated by the second program;
securing, by the virtual machine, the second buffer for the second program in the second operation area, based on the determined physical address of the second buffer, wherein
the first buffer is an area where a data writing operation by the second program is not allowed, and
the second buffer is an area where a data reading operation by the first program is not allowed;
transferring, by the virtual machine, data from the first buffer in the first operation area to the second buffer in the second operation area; and
deleting, by the virtual machine, the data from the first buffer subsequent to the transfer of the data.

\* \* \* \* \*